United States Patent [19]

Bucalo

BEST AVAILABLE COPY

[11] E Re. 29,052

[45] Reissued Nov. 30, 1976

[54] TOILET PAPER ROLL HAVING A CLEANSING COMPOSITION

[76] Inventor: Brian D. Bucalo, 155 Roberts St., Holbrook, N.Y. 11741

[22] Filed: May 6, 1975

[21] Appl. No.: 575,001

Related U.S. Patent Documents

Reissue of:

[64] Patent No.: 3,734,277
Issued: May 22, 1973
Appl. No.: 198,551
Filed: Nov. 15, 1971

[52] U.S. Cl. ..... 206/390; 15/104.93; 156/80

[51] Int. Cl.[2] ..... A47K 7/03; A47K 10/16

[58] Field of Search ..... 15/104.93, 104.94; 206/390; 128/268, 169, 170; 428/43, 351

[56] References Cited

UNITED STATES PATENTS

| | | | |
|---|---|---|---|
| 1,102,203 | 6/1914 | Scott | 206/225 |
| 1,789,699 | 1/1931 | Durham | 206/390 |
| 2,033,621 | 3/1936 | Freedman | 428/43 |
| 2,961,678 | 11/1960 | MacLellan | 15/104.94 |
| 3,120,229 | 2/1964 | Hinkamp | 128/269 X |
| 3,485,349 | 12/1969 | Chaney | 15/104.93 X |
| 3,613,142 | 10/1971 | Chaney | 206/390 X |

FOREIGN PATENTS OR APPLICATIONS

| | | | |
|---|---|---|---|
| 780,443 | 7/1957 | United Kingdom | 15/104.93 |

*Primary Examiner*—Daniel Blum
*Attorney, Agent, or Firm*—Steinberg and Blake

[57] ABSTRACT

A roll of toilet paper which has web portions where the web is folded upon itself and provided with an inner film of cleansing composition and an outer barrier layer so that the film of cleansing composition cannot spread through the convolutions of the roll while at the same time the folded web portions will become unfolded during unwinding of the roll to expose the cleansing composition. After the film of cleansing composition and barrier layer are respectively deposited at opposite faces of the web at preselected areas therealong the web is folded upon itself at the areas where the film of cleansing composition is located and then the film of cleansing composition at each folded web portion is frozen to retain each web portion in its folded condition during winding of the web into a roll.

5 Claims, 3 Drawing Figures

TOILET PAPER ROLL HAVING A CLEANSING COMPOSITION

Matter enclosed in heavy brackets [ ] appears in the original patent but forms no part of this reissue specification; matter printed in italics indicates the additions made by reissue.

BACKGROUND OF THE INVENTION

The present invention relates to toilet paper.

In particular, the present invention relates to rolls of toilet paper which are conventionally composed of a web of absorbent paper which is wound into a roll for use in toilet rooms.

One of the most serious drawbacks encountered with conventional toilet paper rolls of this type resides in the fact that they are incapable of effectively carrying out cleaning operations. Conventional rolls of toilet paper are invariably dry so that when they are used the operation involves only a wiping operation without any cleansing beyond that which is obtained simply from the frictional wiping action.

SUMMARY OF THE INVENTION

It is accordingly a primary object of the present invention to provide a toilet paper roll which will avoid this drawback.

In particular, it is an object of the present invention to provide a toilet paper roll which will have at intervals therealong a film of cleansing composition which will be available to be used for cleaning not only by wiping action but also by the chemical dissolving action of a cleansing cream which may be any conventional cleansing cream.

It is also an object of the present invention to provide a toilet paper roll which can have a film of cleansing composition situated at successive preselected areas therealong in such a way that the film of cleansing composition at the successive areas cannot spread through the convolutions of absorbent paper.

In addition it is an object of the present invention to provide a toilet paper roll according to which the entire roll is composed only of a single web of paper so that complications which would otherwise be encountered in joining together a plurality of webs are avoided.

Thus, it is an object of the invention to provide a relatively inexpensive roll of toilet paper which can be sold at relatively low cost while fulfilling the above objects so that the cleaning capability of the roll of the invention is far beyond that of conventional toilet paper rolls.

According to the invention the toilet paper roll has the form of an elongated web of paper which is wound into a roll and which has transverse lines of perforations between at least some of which there are web portions folded upon themselves to provide at each web portion an intermediate web section situated between inner and outer web sections. Between the intermediate web section and one of the inner and outer web sections is located a film of cleansing composition while the faces of the web sections opposed to those which carry the film are provided with a barrier layer preventing the film from spreading through the convolutions of the web. Thus, when the web is unwound from the roll the areas where the film of cleansing composition is located will become exposed for use. According to the method of the invention, after the film of cleansing composition and the barrier layer are deposited at predetermined areas of the web, the web is folded upon itself to enclose the film of cleansing composition within the barrier layer at each of the folded web portions, and with the web thus folded the cleansing composition is frozen to retain each folded web portion in its folded condition during winding of the web into a roll.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
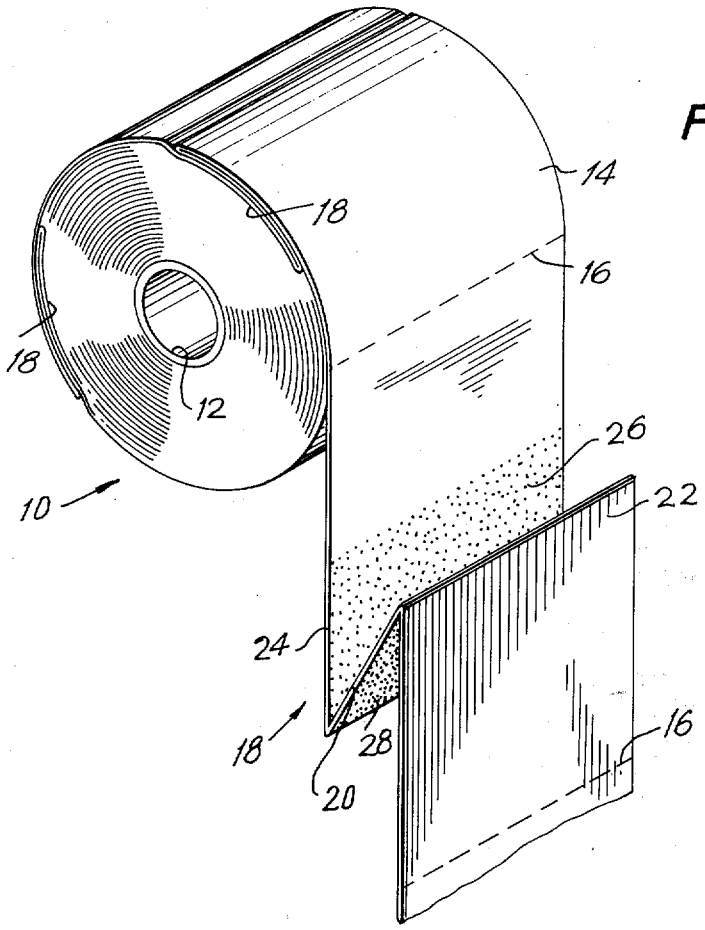
FIG. 1 is a schematic perspective illustration of a roll of toilet paper according to the invention.

Referring to FIG. 1, there is illustrated therein a toilet paper roll 10 according to the present invention. This roll 10 has a conventional interior core or sleeve 12, in the form of a hollow cardboard tube, for example, onto which an elongated web of paper 14 is wound to form the roll 10, as is well known. This web of paper 14 is formed with transverse lines of perforations 16 distributed therealong at predetermined intervals, as is also well known. Thus the paper 14 can conveniently be torn transversely at selected lines of perforations 16.

In accordance with the present invention the web 14, which forms the only layer of paper used for the entire roll 10, is provided between at least some of the lines of perforations 16 with web portions 18. One of the web portions 18 is shown in FIG. 1 in the condition it takes during unfolding thereof, and the present invention will most readily be understood in connection with this particular web portion 18. As may be seen from FIG. 1, the partly unfolded web portion 18 illustrated therein includes an intermediate web section 20 situated between an outer web section 22 and an inner web section 24. This inner web section 24 extends along the roll until it terminates in the outer web section 22 of the next inner web portion 18 while the outer web section 22 extends along the roll until it terminates in the inner web section of the next outer web portion 18.

Between the web section 20 and the inner web section 24 in the illustrated example, the web 14 carries a film 26 of cleansing composition such as a non-evaporative cleansing cream of any well known composition. This film 26 covers that face of the section 20 of the partly unfolded web section 18 in FIG. 1 which is not visible in FIG. 1, as well as the face of section 24 at the partly unfolded section 18 which is directed toward the viewer of FIG. 1. Thus only that part of the film 26 which is on the section 24 at the part thereof visible in FIG. 1 is apparent in FIG. 1.

The outer surfaces of sections 20 and 24, opposite to the surfaces thereof which carry the film 26, are covered with a barrier layer which may take the form of a suitable wax or of a layer of plastic such as polyethylene or the like, this barrier layer preventing the film 26 from spreading through the wound convolutions of the web 14.

As is apparent from FIG. 1, the roll 10 of the invention has the convolutions thereof wound in such a way that the web portions 18 are retained by the convolutions of the roll in their folded condition where each film 26 is enclosed within a barrier layer 28 deposited on those faces of the sections 20 and 24 which are opposite to the faces thereof which carry the film 26, as pointed out above.

While it is possible to locate the film 26 between the intermediate section 20 and the outer section 22 of each web portion 28, the illustrated arrangement is preferred because in this way during unwinding of the roll the film 26 is directed away from the axis of the roll to be directed toward the individual using the roll so that the film 26 becomes immediately visible to the individual unwinding the roll. Also, in the illustrated example a web portion 18 is situated between each pair of successive lines of perforations 16, so that these lines alternate with the web portions 18. With this arrangement the web is torn at each line of perforations, and the total length of sections 20 and 24 is less than half the total length of the web from one line of perforation 16 to the next line of perforation 16, so that there is available to the user between each successive pair of lines of perforations 16 a length of web 14 more than one half of which can be used for drying and wiping purposes after the cleansing cream has been applied. However, it is also possible to provide a roll where the web portions 18 are situated between every second or every third pair of successive lines of perforations 16 so that, for example, there will be from two to four lines of perforations 16 between each pair of successive web portions 18.

Figure 3:
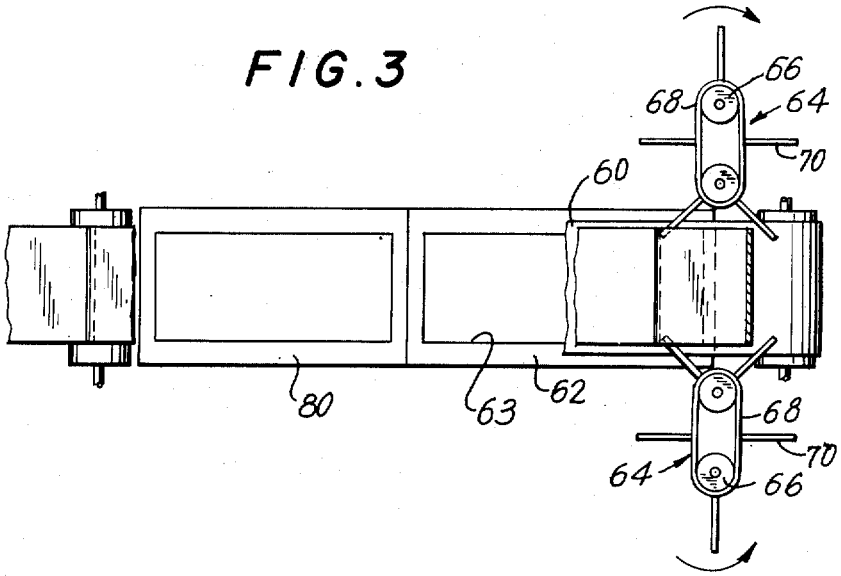
FIG. 3 is a fragmentary top plan view of part of the structure of FIG. 1 schematically illustrating in greater detail how the web is acted upon by the disclosed method and apparatus.
Figure 2:
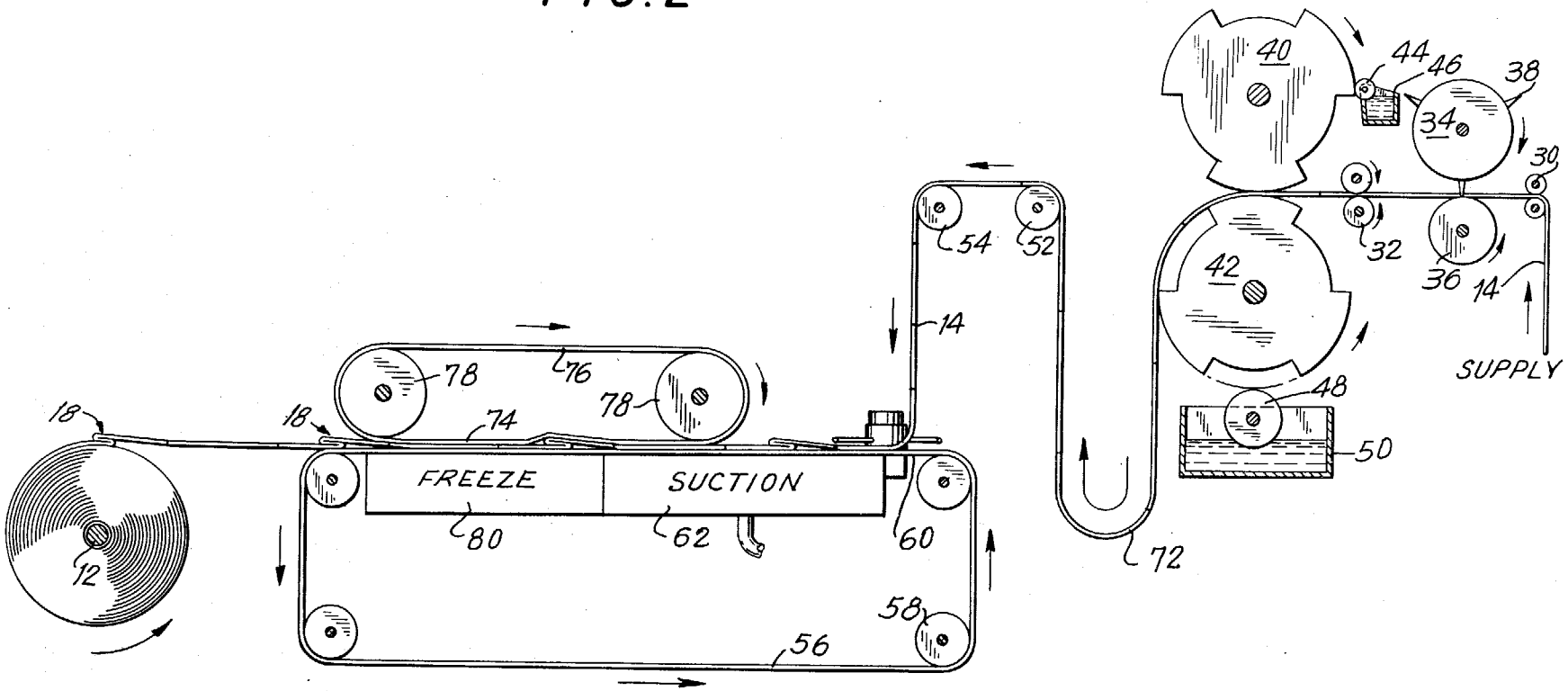
FIG. 2 is a schematic illustration of an apparatus and method for manufacturing the roll of FIG. 1.

Referring to FIGS. 2 and 3, there is illustrated therein a method and apparatus for manufacturing the roll 10 of the invention. As may be seen from FIG. 2, the web 14 is initially derived from any suitable supply source and is moved by a conveyor means along the path illustrated in FIG. 2. The conveyor means includes a pair of feed rolls 30 driven from any suitable source and feeding the web 14 to the left, as viewed in FIG. 2. The conveying of the web is continued by a pair of additional feed rolls 32. Between the feed rolls 30 and 32 is located a conventional perforating roll 34 which is driven from any suitable source and which coacts with a suitable counter roll 36, so that the perforating elements 38 carried by the roll 34 will form the lines of perforations 16 at regular intervals in a well known manner.

Beyond the feed rolls 32 of the conveyor means are located a pair of depositing rolls 40 and 42 for respectively depositing the film 26 and the barrier layer 28. These rolls 40 and 42 are rotated in synchronism through any suitable drive with the upper roll 40 rotating in a clockwise direction while the lower roll 42 rotates in a counterclockwise direction, as viewed in FIG. 2. These depositing rolls 40 and 42 are each provided in the illustrated example with three arcuate projections terminating in outer surfaces located along a cylinder whose axis coincides with that of the roll and with the projections uniformly distributed about the axis of each roll. Thus the projecting portions of the rolls are synchronized to meet with each other and thus continue the feeding of the web 14 beyond the rolls 42. The upper depositing roll 40 engages a transfer roll 44 which is carried by a reservoir 46 of the cleansing composition in such a way that the exterior surface of each projection of the roll 40 receives a film of cleansing composition which subsequently is deposited on the upper surface of the web 14 as it is conveyed to the left beyond the feed rolls 32, as viewed in FIG. 2. Simultaneously the lower roll 42 receives a barrier layer from a transfer roll 48 rotatably carried by a reservoir 50 in which there is situated in molten condition either wax, polyethylene, or any suitable material which can render the area which receives the film 26 impervious to an extent sufficient to prevent the film 26 from spreading through the convolutions of the roll. Thus, the film of cleansing composition and the barrier layer will be simultaneously deposited in opposite faces of the web 14 at predetermined areas distributed along the web 14.

Subsequent to the rolls 40 and 42 the web 14 is supported for free movement along a pair of guide rolls 52 and 54 which are simply supported for free rotary movement in any suitable way.

As the web 14 moves downwardly beyond the roll 54, it is received on the top surface of an endless belt 56. This endless belt 56 is guided for movement around pulleys or rollers 58 any one of which is driven in any suitable way, and the belt 56 is itself in the form of an open mesh so that air can flow freely therethrough. The upper run 60 of the endless belt 56 passes over a suction means 62 so that air is drawn through the web 14 on the upper run 60 so the web 56, thus creating a suction which holds the web 14 against the upper run 60 compelling the web to move with this upper run to the left along the suction means 62. This suction means 62 can have any suitable construction such as a suitable enclosure having a top open end 63 (FIG. 3) located directly next to the lower surface of the web 60 and this enclosure can communicate with any suitable source of suction which will effectively retain the web 14 against the upper run 60 of the endless belt 56.

As may be seen from FIGS. 2 and 3, there are located on opposite sides of the upper run 60, at the right end region of the suction means 62 a pair of units 64 which form a folding means. These units 64 are in the form of vertical rollers or pulleys 66 driven in any suitable way and each pair of rollers 66 carries an endless belt 68. The rollers 66 shown at the upper part of FIG. 3 rotate in a clockwise direction while those shown at the lower part of FIG. 3 rotate in a counterclockwise direction. Each endless belt 68 fixedly carries a plurality of elongated rods or fingers 70 projecting therefrom in the manner shown diagrammatically in FIG. 3. These belts 68 may be made of endless flexible sheets of metal, for example, fixedly carrying the rods or fingers 70 which project therefrom in the manner shown most clearly in FIG. 3. The elevation of the belts 68 is such that the folding rods or fingers 70 simultaneously move across the top of the suction means 62 just over the upper run 60 of the belt 56 at the right end region of the suction means 62. The rotation of the rollers 66 is such that the fingers 70 swing in synchronism across each side of the suction means at its right end region, as viewed in the drawings. Also, the speed of movement of the belts 68 is correlated with the speed of movement of the upper run 60 in such a way that each pair of fingers 70 which swings across the top of the run 60 of the belt 56 will fold a portion 18 of the web 14 into the condition illustrated in FIG. 1, the synchronization and timing being such that the tips of the fingers 70 swing beyond the web 14 at the instant when the intermediate section 20 of each web portion 18 has been folded completely down against the section 24. The synchronization is such that in this way each film 26 becomes folded upon itself and enclosed between a barrier layer 28. The movement of the web at each portion 18 during folding thereof is more rapid than the rate at which the web is moved by the conveyor means, and thus there is located between the roll 42 and the roll 52 an elongated breather loop 72 which is free to move up and down during folding of the web, and in addition at this breather loop it is possible for the barrier layer 28 to dry. The film 26 is non-evaporative and remains in a moist creamy condition.

Once the web has been folded in this way at each of its portions 18, it passes with the folded portion beneath the lower run 74 of an endless belt 76 which is located over the belt 56 and guided by suitable rollers 78 which may be driven in any suitable way so that the belt 76 moves at the same speed as the belt 56. Thus, the folded web portions 18 are maintained in their folded condition as they move to the left with the upper run 60 in FIG. 2.

Just subsequent to the suction means 62, beneath the upper run 60 of the foraminous belt 56 is located a freezing means 70. This freezing means 80 may take different forms. For example it may be in the form of an enclosure which has an open end located directly at the lower surface of the upper run 60 of the belt 66, and any suitable refrigerating apparatus may communicate with the interior of this enclosure so as to maintain it at a temperature which is sufficiently low to cause freezing of the film 26. However, it is also possible to provide a freezing means 80 in the form of a suitable spray device which sprays carbon dioxide, for example, against the folded web sections in order to bring about freezing of the film 26 substantially instantaneously. Because the film 26 is highly viscous in nature and because the viscosity thereof is sharply reduced by the freezing action, the frozen film 26 effectively maintains the web portion 18 in its folded condition as it moves beyond the endless belts 56 and 76.

As the web moves beyond the belts 56 and 76, it is wound onto the core 12 which is rotated in any suitable manner well known in the art, so that in this way the web 14 is formed into the roll 10, and after the roll 10 has increased in diameter to a desired extent, the web is torn at one of the lines of perforations 16 and packaged so that in outer appearance the roll of the invention appears the same as a conventional roll of toilet paper.

Thus, the above operations may go forward continuously in order to effectively achieve the rolls of the invention in an inexpensive manner according to the above-described method and apparatus.

What is claimed is:

1. A toilet paper roll comprising an elongated paper web wound into a roll and formed with transverse lines of perforations distributed along said web to facilitate tearing of the latter along said lines of perforations, said web having between at least some of said lines of perforations web portions each of which is transversely folded upon itself, and each of said web portions including inner and outer web sections separated by an intermediate web section with the inner web section of one web portion extending to the outer web section of the next inner web portion and with the outer web section of each web portion extending to the inner web section of the next outer web portion, so that the roll of wound paper has at each web portion an intermediate section sandwiched between a pair of web sections which respectively form said inner and outer web sections, said web carrying at each web portion between said intermediate section and one of said pair of sections a film of cleansing composition and a barrier layer at the surfaces of said intermediate section and said one section of each web portion which are opposed to the surfaces where said film of cleansing composition is located so that the latter film is retained in the roll between said intermediate section and said one section of each web portion until the roll is unwound whereupon the folded web portions are successively unwound from the roll and simultaneously unfolded to expose the film of cleansing composition retained.

2. The combination of claim 1 and wherein said film of cleansing composition is located at each web portion between said intermediate web section and said inner web section thereof, so that during unwinding of the roll the films of cleansing composition are successively exposed at areas which are directed away from the axis of the roll.

3. The combination of claim 1 and wherein said web portions alternate with said lines of perforations so that one web portion is situated between each pair of successive lines of perforations.

4. The combination of claim 3 and wherein the total length of each intermediate section and inner section of each web portion is no greater than half the distance from one line of perforations to the next line of perforations so that between successive lines of perforations said web has a length at least twice as great as the length of said film of cleansing composition when each web portion is unfolded during unwinding of the roll.

*5. A toilet paper roll comprising an elongated paper web wound into a roll and formed with transverse lines of perforations distributed along said web to facilitate tearing of the latter along said lines of perforations, said web having between at least some of said lines of perforations web portions each of which is transversely folded upon itself, and each of said web portions including inner and outer web sections separated by an intermediate web section with the inner web section of one web portion extending to the outer web section of the next inner web portion and with the outer web section of each web portion extending to the inner web section of the next outer web portion, so that the roll of wound paper has at each web portion an intermediate section sandwiched between a pair of web sections which respectively form said inner and outer web sections, said web carrying at an intermediate section and one of said pair of sections of each web portion an outer barrier layer and an inner film of moist cleansing composition within said outer barrier layer so that the film of cleansing composition is retained in the roll between said intermediate section and said one section of each web portion until the roll is unwound whereupon the folded web portions are successively unwound from the roll and simultaneously unfolded to expose the film of cleansing composition.*

* * * * *